United States Patent
Milde, Jr.

(10) Patent No.: US 9,618,287 B2
(45) Date of Patent: Apr. 11, 2017

(54) SECURE SMARTPHONE-OPERATED LOCKING DEVICE

(71) Applicant: Karl F. Milde, Jr., Mahopac, NY (US)

(72) Inventor: Karl F. Milde, Jr., Mahopac, NY (US)

( * ) Notice: Subject to any disclaimer, the term of this patent is extended or adjusted under 35 U.S.C. 154(b) by 201 days.

(21) Appl. No.: 14/540,316

(22) Filed: Nov. 13, 2014

(65) Prior Publication Data

US 2015/0075232 A1 Mar. 19, 2015

Related U.S. Application Data

(60) Division of application No. 14/017,666, filed on Sep. 4, 2013, now Pat. No. 8,919,024, which is a continuation-in-part of application No. 13/763,951, filed on Feb. 11, 2013, now Pat. No. 8,893,420.

(60) Provisional application No. 61/841,559, filed on Jul. 1, 2013, provisional application No. 61/761,270, filed on Feb. 6, 2013.

(51) Int. Cl.
| | |
|---|---|
| *G05B 19/00* | (2006.01) |
| *F41A 17/54* | (2006.01) |
| *F41A 17/06* | (2006.01) |
| *E05B 47/00* | (2006.01) |
| *H04M 1/725* | (2006.01) |

(52) U.S. Cl.
CPC .............. *F41A 17/54* (2013.01); *E05B 47/00* (2013.01); *F41A 17/066* (2013.01); *H04M 1/72527* (2013.01); *Y10T 70/491* (2015.04)

(58) Field of Classification Search
None
See application file for complete search history.

(56) References Cited

U.S. PATENT DOCUMENTS

| | | | |
|---|---|---|---|
| 5,459,957 A | 10/1995 | Winer | |
| 5,602,536 A * | 2/1997 | Henderson | ............... G07C 1/32 340/5.23 |
| 5,713,149 A | 2/1998 | Cady et al. | |
| 5,915,936 A | 6/1999 | Brentzel | |
| 6,237,271 B1 | 5/2001 | Kaminski | |
| 6,260,300 B1 | 7/2001 | Klebes et al. | |
| 6,301,815 B1 | 10/2001 | Sliwa | |
| 6,321,478 B1 | 11/2001 | Klebes | |
| 6,412,207 B1 | 7/2002 | Crye et al. | |

(Continued)

FOREIGN PATENT DOCUMENTS

| | | | |
|---|---|---|---|
| FR | 2992342 A1 * | 12/2013 | ......... G07C 9/00309 |
| WO | 2008151402 A2 | 12/2008 | |

*Primary Examiner* — Curtis King

(74) *Attorney, Agent, or Firm* — Karl F. Milde, Jr.

(57) ABSTRACT

A gun trigger-locking device which is configured to be manually installed on a gun with a trigger-blocking member disposed behind the trigger to prevent the gun from being fired. The device includes a data receiver, a data memory and a logic device for determining whether data received by the receiver is the same as data stored in the memory. If a data match is indicated, the logic device causes an electromagnetic device to move a locking member to an unlocked position, permitting the trigger-blocking member to be manually removed from the gun so the gun can be fired. A separate electronic key is provided to transmit unlock data to the data receiver of the trigger-locking device. This unlock data may be a password, a long pseudo-random number or biologic data identifying the gun owner or some other person who is licensed or otherwise authorized to fire the gun.

12 Claims, 2 Drawing Sheets

(56) References Cited

U.S. PATENT DOCUMENTS

| | | | |
|---|---|---|---|
| 6,415,542 B1 | 7/2002 | Bates et al. | |
| 6,429,769 B1 | 8/2002 | Fulgueira | |
| 6,711,844 B2 | 3/2004 | Rumfelt | |
| 6,877,097 B2* | 4/2005 | Hamid | G06Q 10/02 340/10.42 |
| 7,353,632 B2 | 4/2008 | Newkirk et al. | |
| 7,356,959 B2 | 4/2008 | Schmitter et al. | |
| 7,770,316 B2 | 8/2010 | Meyerle | |
| 7,924,139 B2* | 4/2011 | Sasakura | B60R 25/2018 340/3.1 |
| 8,138,886 B1* | 3/2012 | Chang | E05B 19/0005 340/5.22 |
| 8,145,352 B2* | 3/2012 | Woodard | G06Q 50/16 340/5.73 |
| 8,205,372 B2 | 6/2012 | Anzeloni | |
| 8,437,740 B2* | 5/2013 | Despain | A47G 29/10 340/5.73 |
| 8,754,744 B2* | 6/2014 | Woodard | G06Q 10/00 340/5.28 |
| 8,825,021 B2* | 9/2014 | Wang | H04W 4/02 340/5.2 |
| 9,109,379 B1* | 8/2015 | Ranchod | E05B 67/00 |
| 2001/0032405 A1 | 10/2001 | Kaminski | |
| 2001/0042332 A1 | 11/2001 | Gering et al. | |
| 2002/0133725 A1* | 9/2002 | Roy | G06K 9/00006 726/5 |
| 2002/0170219 A1 | 11/2002 | Martin | |
| 2003/0231102 A1* | 12/2003 | Fisher | G07C 9/00103 340/5.73 |
| 2003/0231103 A1* | 12/2003 | Fisher | G07C 9/00103 340/5.73 |
| 2004/0244253 A1 | 12/2004 | Glock | |
| 2004/0255623 A1* | 12/2004 | Sun | G07C 9/00563 70/38 A |
| 2005/0090252 A1* | 4/2005 | Ando | G07C 9/00182 455/435.1 |
| 2005/0099262 A1* | 5/2005 | Childress | G07C 9/00309 340/5.6 |
| 2006/0288744 A1* | 12/2006 | Smith | E05B 47/06 70/38 B |
| 2007/0074438 A1 | 4/2007 | Parhofer et al. | |
| 2007/0096870 A1* | 5/2007 | Fisher | E05B 19/0005 340/5.53 |
| 2007/0234052 A1* | 10/2007 | Campisi | E05B 67/00 713/169 |
| 2008/0134556 A1 | 6/2008 | Remelin | |
| 2008/0252415 A1* | 10/2008 | Larson | G07C 9/00309 340/5.73 |
| 2009/0219133 A1* | 9/2009 | Woodard | G07C 9/00103 340/5.65 |
| 2009/0302995 A1* | 12/2009 | Park | E05B 47/00 340/3.1 |
| 2010/0141381 A1* | 6/2010 | Bliding | G07C 9/00309 340/5.61 |
| 2010/0263253 A1 | 10/2010 | Giebel et al. | |
| 2010/0283575 A1* | 11/2010 | Tubb | E05B 39/00 340/5.1 |
| 2010/0283576 A1* | 11/2010 | Loughlin | E05B 37/08 340/5.2 |
| 2011/0001603 A1* | 1/2011 | Willis | G07C 9/00039 340/5.2 |
| 2011/0050419 A1* | 3/2011 | Ng | E05B 39/00 340/542 |
| 2011/0061280 A1 | 3/2011 | Emde et al. | |
| 2012/0075062 A1* | 3/2012 | Osman | G07C 9/00087 340/5.61 |
| 2012/0151814 A1 | 6/2012 | Dietel | |
| 2012/0172018 A1* | 7/2012 | Metivier | G07C 9/00309 455/414.1 |
| 2012/0180357 A1 | 7/2012 | Dietel et al. | |
| 2012/0213362 A1* | 8/2012 | Bliding | G07C 9/00309 380/44 |
| 2012/0280783 A1* | 11/2012 | Gerhardt | G07C 9/00309 340/5.6 |
| 2013/0176107 A1* | 7/2013 | Dumas | G07C 9/00571 340/5.61 |
| 2013/0255335 A1* | 10/2013 | Jonely | E05B 47/0001 70/277 |
| 2013/0257590 A1* | 10/2013 | Kuenzi | G05B 1/01 340/5.65 |
| 2013/0318847 A1 | 12/2013 | Kelly | |
| 2013/0335193 A1* | 12/2013 | Hanson | H04W 12/06 340/5.61 |
| 2014/0150316 A1 | 6/2014 | Acarreta | |
| 2014/0150502 A1* | 6/2014 | Duncan | G07C 9/00309 70/20 |
| 2014/0218167 A1* | 8/2014 | Tseng | E05B 47/02 340/5.61 |
| 2014/0250954 A1* | 9/2014 | Buzhardt | E05B 39/04 70/20 |
| 2015/0033807 A1* | 2/2015 | Yang | E05B 47/00 70/14 |
| 2015/0371469 A1* | 12/2015 | Scalisi | E05B 47/026 340/5.52 |
| 2016/0104334 A1* | 4/2016 | Handville | G07C 9/00571 340/5.61 |
| 2016/0217637 A1* | 7/2016 | Gengler | G07C 9/00174 |

\* cited by examiner ial Appli-
SECURE SMARTPHONE-OPERATED LOCKING DEVICE

CROSS-REFERENCE TO RELATED APPLICATION

This application claims priority from Provisional Application No. 61/761,270 filed Feb. 6, 2013, and patent application Ser. No. 13/763,951 filed Feb. 11, 2013, both entitled "SECURE SMARTPHONE-OPERATED GUN TRIGGER LOCK". This application also claims priority from Provisional Application No. 61/841,559 filed Jul. 1, 2013, entitled "SECURE SMARTPHONE-OPERATED GUN LOCK-" and patent application Ser. No. 14/017,666 filed Sep. 4, 2013, entitled "SECURE SMARTPHONE-OPERATED GUN TRIGGER LOCK-" (now U.S. Pat. No. 8,919,024, issued Dec. 30, 2014).

This application is a division of the aforesaid patent application Ser. No. 14/017,666 (now U.S. Pat. No. 8,919,024, issued Dec. 30, 2014) and claims priority therefrom.

BACKGROUND OF THE INVENTION

The present invention relates to a gun lock for a trigger-operated gun which is designed to be installed on the gun in a position behind the trigger to prevent the trigger from firing the gun.

Mechanical gun locks are designed to be installed on the gun in a position behind the trigger to prevent the trigger from firing the gun. These gun locks use a mechanical key that can be easily duplicated, and the locks themselves can be compromised by means of a master key or a lock pick.

Furthermore, such gun locks can be opened by anyone in possession of one of the keys. With such gun locks it is not possible to restrict the use of the gun to the gun owner or to some other person who is licensed or otherwise authorized to use the gun.

SUMMARY OF THE INVENTION

It is a principal object of the present invention to provide a gun lock for a trigger-operated gun which is difficult to compromise and allows only the gun owner, or some other person who is licensed or otherwise authorized to use the gun.

This object, as well as other objects which will become apparent from the discussion that follows, is achieved, in accordance with the present invention, by providing a trigger-locking device which is configured to be applied to and locked on a gun behind the trigger to prevent the gun from firing. The trigger-locking device includes a data receiver, a data memory and a logic device for determining whether data received by the receiver is the same, or substantially the same, as data stored in the memory. If a data match is indicated, the logic device causes an electromagnetic device to unlock the trigger-locking device allowing it to be removed from the gun, thus permitting the gun to be fired.

According to a preferred embodiment of the invention, the gun lock device further comprises an "electronic key" having a data transmitter for transmitting gun unlock data to the data receiver of the trigger-locking device. This gun unlock data may be a password, a long pseudo-random (and therefore nearly hack-proof) number or biologic data identifying the gun owner or some other person who is licensed or otherwise authorized to use the gun.

More particularly, the trigger-locking device includes:
(a) a trigger-blocking member configured to be manually installed on the gun in a position behind the trigger to prevent the gun from firing;
(b) a locking member, associated with the trigger-blocking member and movable between a locked position which prevents the trigger-blocking member from being removed from the gun and an unlocked position which enables the trigger-blocking member to be manually removed from behind the trigger;
(c) an electromechanical device disposed on the trigger-locking device and coupled to the locking member for moving the locking member from a locked position to an unlocked position in response to at least one electric signal;
(d) a data receiver for receiving a gun unlock signal with gun unlock data;
(e) a data memory for storing data; and
(f) a first logic device, coupled to the data receiver and to the data memory, for comparing said gun unlock data received by the receiver with data stored in the memory upon receipt of the gun unlock signal, and for producing the at least one electric signal to actuate the electromechanical device and move the locking member to the unlock position when the stored data and the received data are substantially the same.

The first logic device is thus operative in this trigger-locking device to cause the electromechanical device to:

move the locking member to the unlocked position when the gun unlock data received by the receiver is substantially the same as the data stored in the memory, and maintain the locking member in the locked position at all other times, thereby to prevent unauthorized operation of the gun.

Optionally, the data receiver is further operative to receive a gun lock signal and the first logic device, upon receipt of the gun lock signal, is operative to cause the electromagnetic device to move the locking member to the locked position.

The first logic device, upon producing the electric signal, may cause the electromagnetic device to move the locking member to the unlocked position for a first duration of time, and thereafter to move the locking member back to the locked position. The first duration of time is preferably selected from the group consisting of:
(i) less than 1 minute;
(ii) a range of time from 1 minute to 5 minutes;
(iii) a range of time from more than 5 minutes to 30 minutes; and
(iv) more than 30 minutes.

In an alternative embodiment of the invention, the locking member, after being moved to the unlocked position remains in that position until a gun lock signal is received by the data receiver or the trigger-locking device is manually locked.

According to the invention the electronic key has a data transmitter for transmitting gun unlock data to the data receiver in the trigger-locking device. As mentioned above, the gun unlock data may include a password, a pseudo-random number or data identifying a putative authorized person who wishes to use the gun. The pseudo-random number is preferably generated by the electronic key when the trigger-locking device is first used.

According to a preferred embodiment of the invention, the electronic key comprises:
(a) an input device, for inputting information from a putative authorized person who wishes to unlock the trigger-locking device; and
(b) a second logic device, coupled to both the data transmitter and the input device, for generating unlock data defined by the putative authorized person and for causing the data transmitter to transmit the unlock data to the data receiver. The putative authorized person is recognized as an authorized person if the unlock data substantially matches the stored data in the data memory of the trigger-locking device.

When a biologic identifier is used to unlock the trigger-locking device, the data stored in its memory may include at least one biologic identifier of the owner or an authorized person.

The input device of the electronic key may be a camera, for example. In this case, the camera is operative to record an image of the putative authorized person as a biologic identifier, which image may be:
- a facial image;
- an image of an iris;
- a retinal image;
- a fingerprint;
- a palm print; and
- an image of veins of a hand;

The second logic device is then operative to process the image and to generate the unlock data therefrom.

Alternatively, the input device may be a microphone. The second logic device is then operative to process a voiceprint of the putative authorized person as a biologic identifier and to generate the unlock data therefrom.

Finally, the input device may be an alphanumeric keyboard, whereby:
(i) the putative authorized person may input an alphanumeric code; and
(ii) the putative authorized person is recognized as an authorized person in the event of the inputted code matching the stored data.

The trigger-locking device preferably comprises a first battery for providing power to at least one of the logic device, the data receiver and the data memory and a second battery for providing power to the electromechanical device which is power thirsty compared to the electronic devices.

Preferably, an electric device is provided for selectively utilizing the still-functional battery when one of the two batteries is depleted.

Preferably also, the electromechanical device is operative to move the locking member to the first position in the event of battery depletion.

Advantageously, the data memory comprises at least one write-once-only element to prevent degradation of the data stored in the memory and to prevent the data stored in the memory from being changed. The write-once-only element may be a PROM, an EPROM or an EEPROM, for example.

According to a preferred embodiment of the invention, the trigger-locking device comprises at least one tamper detecting device, situated in proximity to the trigger, for detecting external manipulation of at least one of (1) the logic device, the (2) electromechanical apparatus, and (3) the locking member. This tamper detecting device preferably generates a tamper signal upon the detection of the external manipulation, which tamper signal causes the electromechanical device to maintain the locking member in the locked position for a second duration of time. The tamper detecting device may be a separate element or it may be implemented by the first logic device.

Advantageously, the trigger-locking device comprises a transmitting device, coupled to the tamper detecting device, for transmitting an alarm upon generation of the tamper signal.

According to still another preferred embodiment of the present invention, the data memory may be operative to store identifying information of a registration person authorized to input data to the data memory which identifies the authorized person. In this case, the first logic device is made operative to store data concerning a person authorized to use the gun, in the data memory only if the authorized person identification information is accompanied by identification of a putative registration person that substantially matches the stored registration person identification information. Also, the first logic device is made operative to change the data stored in the data memory only if the identification information is accompanied by identification of a putative registration person that substantially matches the stored registration person identification information.

Finally, according to still another preferred embodiment of the present invention, the electromechanical device includes an electric motor coupled to a gear reduction mechanism for rotating a cam. The movable member of the trigger-locking device is moved by the cam between the locked position and the unlocked position.

Alternatively, the electric motor may be a servo-motor which is coupled mechanically to the movable member to move this member back and forth between the two positions.

In yet another alternative embodiment of the invention, an electromagnetically controlled two-position switching device may be used to control the position of the locking member.

For a full understanding of the present invention, reference should now be made to the following detailed description of the preferred embodiments of the invention as illustrated in the accompanying drawings.

DETAILED DESCRIPTION OF THE PREFERRED EMBODIMENTS

Figure 1:
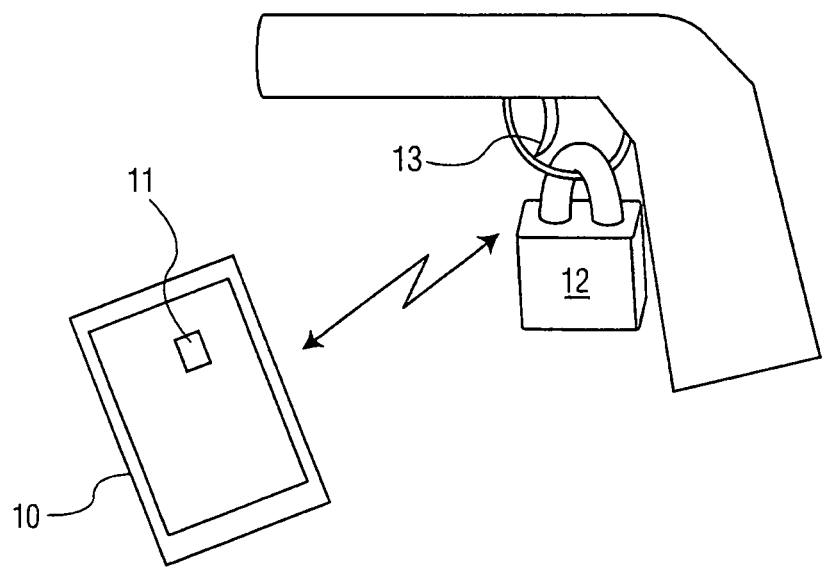
FIG. 1 is a representational diagram showing a smartphone and a gun that is eguipped with a trigger-locking device according to the present invention.

The preferred embodiments of the present invention will now be described with reference to FIGS. 1-3 of the drawings. Identical elements in the various figures are identified with the same reference numerals.

Briefly in overview, a trigger-locking device is designed to be manually installed on a gun in the recess behind the trigger in the lower receiver mechanism, blocking rearward movement of the trigger. When installed and locked, the trigger-locking device cannot be unlocked without the use of an "electronic key" which is described below. When a proper electronic signature is transmitted to the trigger-locking device by the electronic key, a movable member within the trigger-locking device is moved to an unlocked position, allowing the device to be opened and manually removed from the gun.

The trigger-locking device has a Bluetooth receiver (or some other type of signal receiver) and a stored number. When this particular number is received from a smartphone or similar device, the trigger-locking device is unlocked and can be removed from a gun.

FIG. 1 illustrates this configuration. A smartphone 10 has an App 11 called "Gunlock" that presents a button called "Gun Unlock." By pressing this button on the App, the operator sends a password, a pseudo-random number or biologic ID data by a wireless transmission to a trigger-locking device 12 that has been manually installed on a gun behind the trigger 13, preventing the gun from being fired. If the data sent to the trigger locking device matches the data stored in its memory, the trigger-locking device can be unlocked and removed from the gun. The trigger-locking device is therefore similar to, and can be called, an "electronic padlock," openable only upon receipt of a proper signal.

Figure 2:
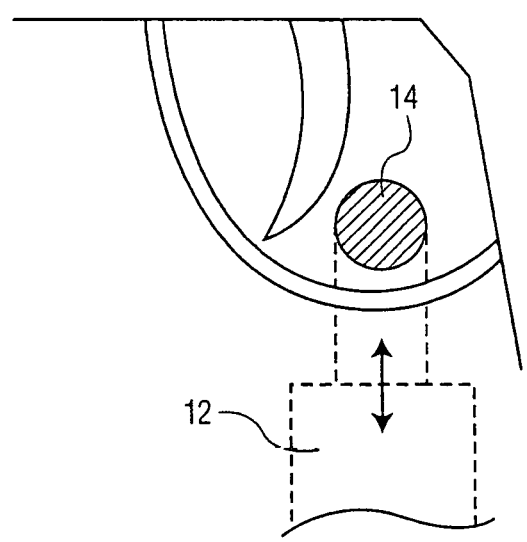
FIG. 2 is a close-up view of the trigger region of the gun of FIG. 1 with the trigger-locking device installed.

FIG. 2 shows the trigger-locking device 12 with a locking member 14. When the device receives a data packet that matches the corresponding data stored in its memory, it shifts the position of a movable member (inside the device 12), allowing the trigger-locking device to be opened and removed from the gun, allowing the gun to be fired.

The smartphone can be made secure in any number of ways. It can be password protected or, preferably, it can use of its camera to verify the ID of the person holding this device. For example, the security App may use face recognition or iris recognition software to identify the owner from the camera image.

When the trigger-locking device 12 is first used, the Gunlock App can generate a pseudo-random number and send it to the trigger-locking device for storage in its permanent memory. Once stored, this number can be changed only by an authorized person, such as the gun owner, or a "registration person" who is licensed to make changes in the data stored in memory. Thereafter, whenever the smartphone sends this number again, the trigger-locking device is released and can be removed from the gun, allowing the gun to be fired. Before sending the unlock number, the user of the smartphone may be required to identify himself/herself by entering biologic identifying information into the phone for a recognition algorithm. Alternatively, the biologic ID information may be sent to the trigger-locking device for matching with corresponding biologic identifying data stored therein.

Firing the gun is therefore a three-step process for the gun owner or authorized user:

(1) Verify his/her identity with the smartphone; and
(2) Press the Gun Unlock button to release the trigger locking device; and
(3) Remove the trigger-looking device from the gun.

The trigger remains unlocked until the gun user presses another button on the Gunlock app, appropriately called "Gun Lock," or until the trigger-locking device times out and automatically locks itself again by restoring the movable member to the locked position.

The trigger-locking device 12 may be powered by a replaceable and/or rechargeable battery (not shown) or, in accordance with a particular feature of the invention, it may be powered by the transmitted signal or by a separate coil which receives power from the smartphone or other device by magnetic induction.

Figure 3:
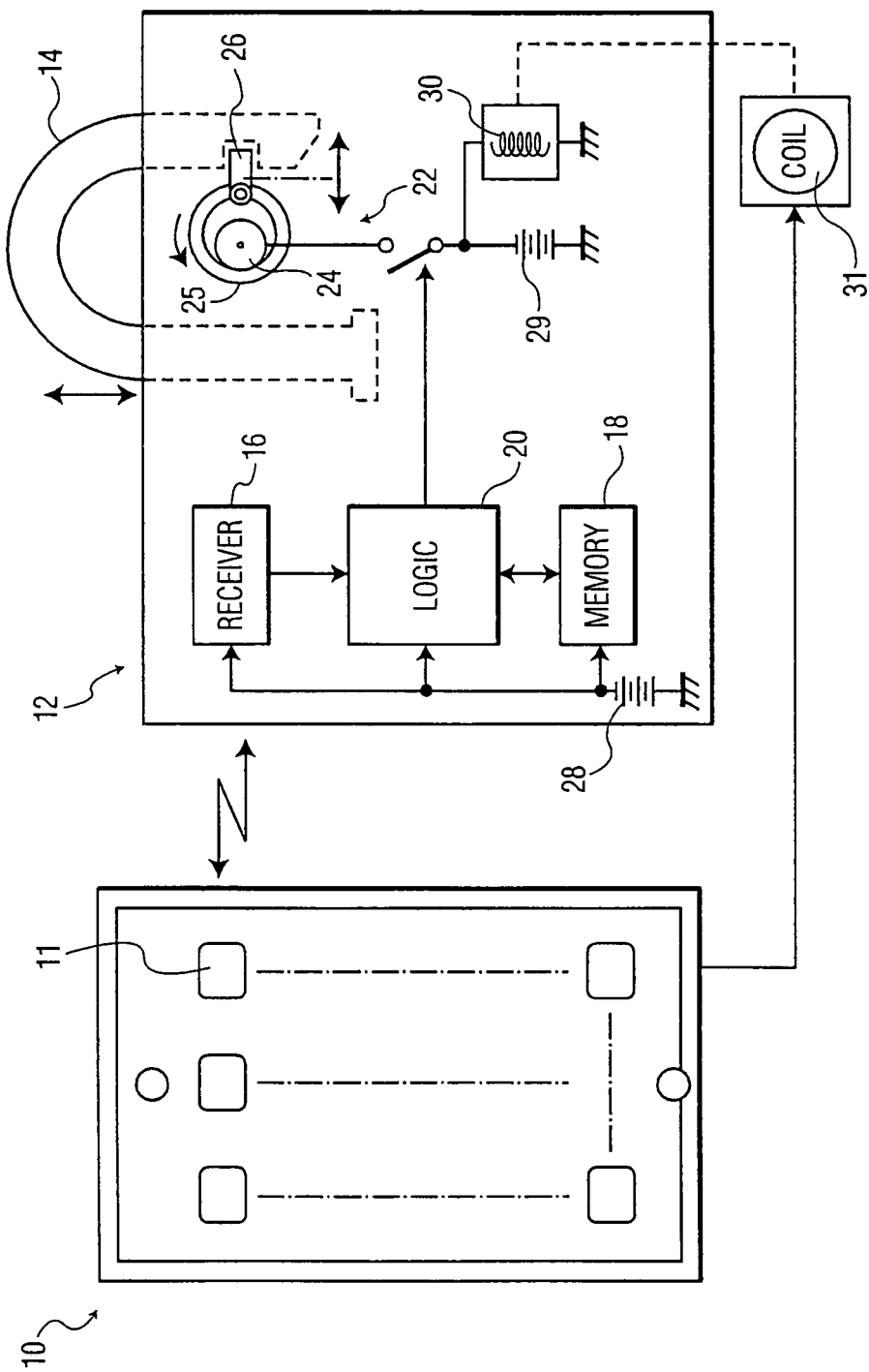
FIG. 3 is a block diagram of the electronic and electromagnetic devices in the trigger-locking device.

FIG. 3 shows the individual elements of the gun lock apparatus. The smartphone 10 transmits to a receiver 16 in the trigger-locking device 12, preferably via a wireless Bluetooth connection. Alternatively, the smartphone may be coupled to the receiver by a wire connection, for example through a USB port. The receiver 16 and a data memory 18 are both coupled to a logic device 20 that compares the data received from both the receiver and the memory and sends an electric signal to an electromechanical device 22 when and if there is a match.

If biologic ID data has been sent to the receiver by the smartphone 10, the data may not be an exact match; however, the received signature data may be sufficiently close to the previously stored bio-ID data to satisfy the requirement that the person holding the smartphone is indeed the owner of the gun.

The electromechanical device 22 preferably includes a micro-motor 24 that turns a cam 25 through a speed reduction gear mechanism. In this way, a very small motor may generate sufficient torque to move the movable member 26 from its locked position to the unlocked position thus permitting the trigger-locking device to be removed from the gun. The relatively large forces that may be required to shift the movable member 26 from the locked position to the unlocked position are taken up by the cam 25. Upon rotation it moves the movable member 26 toward the unlocked position allowing the locking member to be lifted up and opened in the manner of a padlock, so that the trigger-locking device can be removed from a gun.

The electronic circuits 16, 18 and 20 are powered by a battery 28; the electromechanical device 22 is preferably powered by a separate, larger battery 29. Preferably, at least the larger battery 29 is rechargeable, either directly by a wire connection or indirectly by magnetic induction via induction coils 30 and 31.

There has thus been shown and described a novel secure smartphone-operated gun trigger lock which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. Locking apparatus including a locking device which can be unlocked only by an authorized person who wishes to unlock the locking device, said apparatus comprising:
   (a) the locking device, said device having a first source of electrical power and including:
      (1) a movable member, movable between a locked position, in which the locking device is locked, and an unlocked position in which the locking device unlocked;
      (2) an electromechanical device coupled to the first source of power and to the moveable member for moving the movable member from the locked position to the unlocked position in response to at least one electric signal;
      (3) a first data memory for storing first unlock data;
      (4) a wireless receiving ("R") device for receiving a transmitted signal representing second unlock data; and
      (5) a first digital logic device, coupled to the first source of power, to the R device and to the first data memory, for comparing said second unlock data represented by said transmitted signal with said first unlock data stored in the first data memory and for producing said at least one electric signal to actuate the electromechanical device, and thereby move the movable member to the unlocked position, when the first unlock data stored in said first data memory and the second unlock data received by the R device are substantially the same;
   (b) a phone app for a portable smartphone that includes a second source of electrical power and comprises the following components:
      (1) a second data memory for storing said second unlock data;

(2) a wireless transmitting ("T") device, coupled to said second source of power, for transmitting said signal representing said second unlock data to said R device; and (3) a second digital logic device, coupled to said second source of power, to said second data memory and to said T device;

said phone app being operative to control said second digital logic device to cause said T device to transmit said signal representing second unlock data stored in said second data memory to said R device, thereby to unlock said locking device when said second unlock data stored in said second data memory is substantially the same as said first unlock data stored in said first data memory;

wherein said first unlock data include information identifying a registration person authorized to input data to said first data memory, and said first logic device is operative to store further data in said first data memory only if said further data is accompanied by identification information of a putative registration person that substantially matches the registration person identifying information stored in said first data memory.

2. The locking apparatus of claim 1, wherein the first and second unlock data further include a pseudo-random number.

3. The locking apparatus of claim 1, wherein the first and second unlock data further include data identifying said smartphone.

4. The locking apparatus of claim 1, wherein the first and second unlock data further include a password selected by said authorized person who wishes to unlock said locking device.

5. The locking apparatus of claim 1, wherein the smartphone further comprises a first input device, coupled to said second logic device, for entering unlock data from a putative authorized person who wishes to unlock the locking device, wherein said phone app is operative to control said second digital logic device to receive data entered at said first input device, to generate therefrom said second unlock data and to store said second unlock data in said second data memory.

6. The locking apparatus of claim 5, wherein the first input device is a sensor device for sensing biologic data identifying the putative authorized person who wishes to unlock the locking device and wherein the second digital logic device is operative to process the sensed biologic data to generate therefrom the second unlock data.

7. The locking apparatus of claim 6, wherein the sensor device is a microphone, and wherein the second digital logic device is operative to process a voiceprint of the fir s putative authorized person as a biologic identifier to generate therefrom the second unlock data.

8. The locking apparatus of claim 5, wherein said first input device is an alphanumeric keyboard by means of which the putative authorized person may enter an alphanumeric code; and wherein second digital logic device is operative to process said alphanumeric code to generate therefrom said second unlock data.

9. The locking apparatus of claim 6, wherein said sensor device is a camera.

10. The locking apparatus of claim 1, wherein said first unlock data include biologic data identifying the person authorized to unlock the locking device and said second unlock data include biologic data identifying a putative authorized person who wishes to unlock the locking device.

11. The locking apparatus of claim 10, wherein said biologic data identifying said authorized person and said putative authorized person include at least one of a facial image, an image of an iris, a retinal image, a fingerprint, a palm print and an image of veins of a hand.

12. The locking apparatus of claim 1, wherein said first digital logic device is operative to change the data stored in said first data memory only if an instruction indicating said change is accompanied by identification information of a putative registration person that substantially matches said registration person identifying information stored in said first memory.

* * * * *